US012443256B2

(12) United States Patent
Stiedl et al.

(10) Patent No.: US 12,443,256 B2
(45) Date of Patent: Oct. 14, 2025

(54) POWER SUPPLY SYSTEM FOR A DATA CENTRE

(71) Applicant: Huawei Digital Power Technologies Co., Ltd., Shenzhen (CN)

(72) Inventors: Andreas Stiedl, Munich (DE); Roland Huempfner, Nuremberg (DE)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/464,018

(22) Filed: Sep. 8, 2023

(65) Prior Publication Data
US 2023/0418348 A1     Dec. 28, 2023

Related U.S. Application Data

(63) Continuation of application No. PCT/EP2021/087176, filed on Dec. 22, 2021.

(51) Int. Cl.
G06F 1/26       (2006.01)
H02M 3/158    (2006.01)
H02M 7/217    (2006.01)

(52) U.S. Cl.
CPC ............. *G06F 1/26* (2013.01); *H02M 3/158* (2013.01); *H02M 7/217* (2013.01)

(58) Field of Classification Search
CPC ... H02J 1/00; G06F 1/00; H02M 3/00; H02M 7/00
See application file for complete search history.

(56) References Cited

U.S. PATENT DOCUMENTS

2006/0284489 A1*  12/2006  Gross ................. H02J 7/02
                                                          307/64
2012/0134090 A1*  5/2012  Peng .................. G06F 1/189
                                                          361/679.31

(Continued)

FOREIGN PATENT DOCUMENTS

CN       201369673 Y       12/2009
CN       111262443 A       6/2020

(Continued)

OTHER PUBLICATIONS

Xu et al: "Researches on grounding modes of the AC/DC hybrid system with various distributed renewable energy" The Journal of Engineering, The Institution of Engineering and Technology, Michael Faraday House, Six Hills Way, Stevenage, Herts. SG1 2AY, UK, vol. 2019, No. 16, Mar. 1, 2019, pp. 3035-3038 (Year: 2019).*
Xu et al., "Researches on grounding modes of the AC/DC hybrid system with various distributed renewable energy," The 14th IET International Conference on AC and DC Power Transmission (ACDC 2018), Received Aug. 2018, Total 4 pages (Jan. 2019).

(Continued)

*Primary Examiner* — Rexford N Barnie
*Assistant Examiner* — Joseph N Inge
(74) *Attorney, Agent, or Firm* — Leydig, Voit & Mayer, Ltd.

(57) ABSTRACT

A power supply system includes one or more solid state transformers (SST), one or more first stage DC-DC converters and one or more second stage DC-DC converters. The one or more solid state transformers (SST) are configured to convert any medium-voltage Alternating Current (MVAC) input or medium-voltage Direct Current (MVDC) input to a first low-voltage Direct-Current (LVDC) output. The one or more first stage DC-DC converters are configured to convert the first low-voltage DC output to a second LVDC output. The one or more second stage DC-DC converters are configured to convert the second LVDC output to a third LVDC output. The third LVDC output is used to supply power to one or more servers in a data centre ICT load area.

8 Claims, 5 Drawing Sheets

(56) References Cited

U.S. PATENT DOCUMENTS

| | | | | |
|---|---|---|---|---|
| 2014/0001856 A1* | 1/2014 | Agamy | ............... | H02M 3/155 |
| | | | | 307/43 |
| 2015/0180232 A1* | 6/2015 | Mino | ..................... | H02J 7/35 |
| | | | | 307/66 |
| 2017/0077704 A1* | 3/2017 | Faley | ..................... | H02J 5/00 |
| 2017/0110969 A1* | 4/2017 | Zhou | ............... | H02M 3/33571 |
| 2019/0033942 A1* | 1/2019 | Cochran | .................. | G06F 1/28 |
| 2023/0178982 A1* | 6/2023 | Ortiz | ..................... | H02J 1/08 |
| | | | | 307/24 |

FOREIGN PATENT DOCUMENTS

| | | | | |
|---|---|---|---|---|
| EP | 4033629 A1 | 7/2022 | | |
| WO | WO-2014026840 A2 * | 2/2014 | ............ | H02J 9/061 |
| WO | 2016105272 A1 | 6/2016 | | |
| WO | 2021169430 A1 | 9/2021 | | |

OTHER PUBLICATIONS

Pratt et al., "Evaluation of 400V DC Distribution in Telco and Data Centers to Improve Energy Efficiency," Intelec 07-29th International Telecommunications Energy Conference, total 8 pages, Institute of Electrical and Electronics Engineers, New York, New York (Sep. 30, 2007).

Tu et al., "Extreme Fast Charging of Electric Vehicles: A Technology Overview," IEEE Transactions on Transportation Electrification, total 17 pages, Institute of Electrical and Electronics Engineers, New York, New York (Dec. 10, 2019).

Series L: Construction, Installation and Protection of Cables and Other Elements of Outside Plant—Architecture of power feeding systems of up to 400 VDC, Recommendation ITU-T L.1201, International Telecommunication Union, total 32 pages, International Union of Telecommunication, Geneva, Switzerland (Mar. 2014).

* cited by examiner

416

418

420

422

POWER SUPPLY SYSTEM FOR A DATA CENTRE

CROSS-REFERENCE TO RELATED APPLICATIONS

This application is a continuation of International application No. PCT/EP2021/087176, filed on Dec. 22, 2021, the disclosure of which is hereby incorporated by reference in its entirety.

FIELD

The application relates to power supply systems, more particularly, the application relates to a power supply system for a data centre.

BACKGROUND

A data centre is a centralized facility for storing, processing, and disseminating data and applications for IT and telecom operations. As the data centre stores valuable intangible assets of an organization, security and reliability of the data centre is of vital importance.

Most of the data centres are based on Low Voltage Alternating Current, LVAC architecture, and power distribution with Low Frequency Transformer, LFT, with 50 Hz or 60 Hz. The LVAC architecture includes large scale power conversion blocks of up to several megawatts with the capability of causing very high short circuit currents. Heavy and high-power bus bar systems are included in the LVAC architecture. For short circuit protection, large and expensive short circuit protection devices are included, which makes the LVAC architecture more expensive to implement. The data centres with LVAC may have reactive power that needs to be compensated by additional equipment else resulting in additional losses in the LVAC architecture. The LVAC typically includes a relative low distribution voltage system with 400V/230V/50 Hz 3-phase with neutral and earth conductor resulting in large cross-section cabling. Further, for high availability requirements with a N+N redundant system, the LVAC architecture is oversized for double power.

The LVAC architecture has to compensate low frequency (100 Hz) power ripple with large local energy storage devices (DC link capacitors) in every AC/DC power conversion equipment, which requires more power conversion stages (two stages versus one) and results in lower conversion efficiency causing more voltage drop on cabling and other power distribution elements. The LVAC architecture contains reactive power that needs to be compensated by additional equipment not existing in LVDC systems. Further, the LVAC architecture requires an AC-Uninterruptible Power Supply, UPS with AC-DC-AC power conversion.

Therefore, the present disclosure aims to improve the distribution of effective power to the data centre of existing systems or technologies with less power conversion stages and less power distribution elements.

SUMMARY

The present disclosure provides a power supply system for a data centre with higher power effective distribution and less power conversion stages and less power distribution elements while avoiding one or more disadvantages of prior art approaches.

The disclosure provides a power supply system for a data centre.

According to a first aspect, there is provided a power supply system for a data centre including:
- I. one or more Solid State Transformers, SST, configured to convert Medium-Voltage Alternating Current, MVAC, input or Medium-Voltage Direct Current, MVDC, input to a first Low-Voltage Direct Current, LVDC, output,
- II. one or more first stage DC-DC converters configured to convert the first Low-Voltage Direct Current, LVDC output to a second LVDC output, and
- III. one or more second stage DC-DC converters configured to convert the second LVDC output to a third LVDC output. The third LVDC output is used to supply power to one or more servers in the data centre.

The power supply system provides a higher effective distribution voltage of DC voltage, thereby reducing cost in cabling and distribution. The power supply system is a more efficient power conversion system with less power conversion stages. The power supply system is a novel redundancy feed system that uses LVDC, e.g., +750 V DC and −750 V DC, as a backup to each other. The power supply system provides better fault isolation and selectivity in distribution and mitigates a fault progression in the power supply system (i.e. power partition by converter arrays with N+1 redundancy). The power supply system provides constant power to the one or more servers, avoiding 100 Hz ripple in the power supply. The power supply system provides less short circuit energy to handle by use of power partitioning by smaller power conversion blocks by using output current limiting solid-state transformers. The power supply system includes a Single Point of Failure, SPOF, analysis to provide maximum resilience in a power architecture or a power infrastructure. The power supply system provides higher DC voltage to reduce distribution loss.

The power supply system for the data centre includes power partitioning that provides input parallel and output separate to transport the power efficiently. The power supply system provides fault isolation and ground fault monitoring of isolated terra floating system. The power supply system provides low ground fault currents due to an isolated grid. The power supply system provides high power density with a bipolar DC transmission system, for example, +/−750V with a floating midpoint, potential shift technology that supports ground fault detection. The power supply system for the data centre provides high flexibility in selecting battery autonomy in one or more places with one or more rack rows and white space areas. The power supply system may monitor the power infrastructure using a Power Line Communication, PLC.

Preferably, the MVAC input or the MVDC input is supplied from at least two input feeds.

Preferably, the first LVDC output and the second LVDC output are provided as a single voltage or two equal voltages of opposite polarities.

Preferably, the value of the first LVDC output is one of +750 V DC, +/−750 V DC, or +1500 V DC.

Preferably, the value of the second LVDC output is +/−375 V DC.

Preferably, the third LVDC output is secure extra low voltage, SELV.

Preferably, the power supply system includes one or more redundancy devices to provide power backup at every stage in the power supply system.

Preferably, the one or more redundancy devices is a partial power converter.

Preferably, the partial power converter includes a resonant balancer circuit to split an input voltage into two equal halves.

Preferably, the one or more redundancy devices is a transformer coupled balancer with voltage split functionality.

Preferably, the one or more redundant balancers include a plurality of diodes configured to block power flow back into a failure location in the power supply system.

Preferably, the power supply system includes one or more transfer switches disposed between the one or more first stage DC-DC converters and the one or more second stage DC-DC converters to create a secondary feed redundancy.

Preferably, the power supply system includes a permanent isolation monitoring means at an output of each of the one or more SSTs.

Preferably, the power supply system includes a selective fault protection means at least an input of each of the one or more SSTs.

Preferably, the power supply system includes a power line communication means in at least each of the one or more SSTs, the one or more first stage DC-DC converters, and the one or more second stage DC-DC converters.

Therefore, in contradistinction to the prior art, the disclosed power supply system provides a more efficient power conversion system with less power conversion stages that step down with one or more unregulated converters. The power supply system provides better fault isolation and better distribution of the power with reduced distribution loss.

These and other aspects of the disclosure will be apparent from the implementations described below.

BRIEF DESCRIPTION OF DRAWINGS

Implementations of the disclosure will now be described, by way of example only, with reference to the accompanying drawings, in which.

DETAILED DESCRIPTION

Implementations of the disclosure provide a power supply system for a data centre with higher power effective distribution and less power conversion stages.

To make solutions of the disclosure more comprehensible for a person skilled in the art, the following implementations of the disclosure are described with reference to the accompanying drawings.

Terms such as "a first", "a second", "a third", and "a fourth" (if any) in the summary, claims, and foregoing accompanying drawings of the disclosure are used to distinguish between similar objects and are not necessarily used to describe a specific sequence or order. It should be understood that the terms so used are interchangeable under appropriate circumstances, so that the implementations of the disclosure described herein are, for example, capable of being implemented in sequences other than the sequences illustrated or described herein. Furthermore, the terms "include" and "have" and any variations thereof, are intended to cover a non-exclusive inclusion. For example, a process, a method, a system, a product, or a device that includes a series of steps or units, is not necessarily limited to expressly listed steps or units but may include other steps or units that are not expressly listed or that are inherent to such process, method, product, or device.

Figure 1:
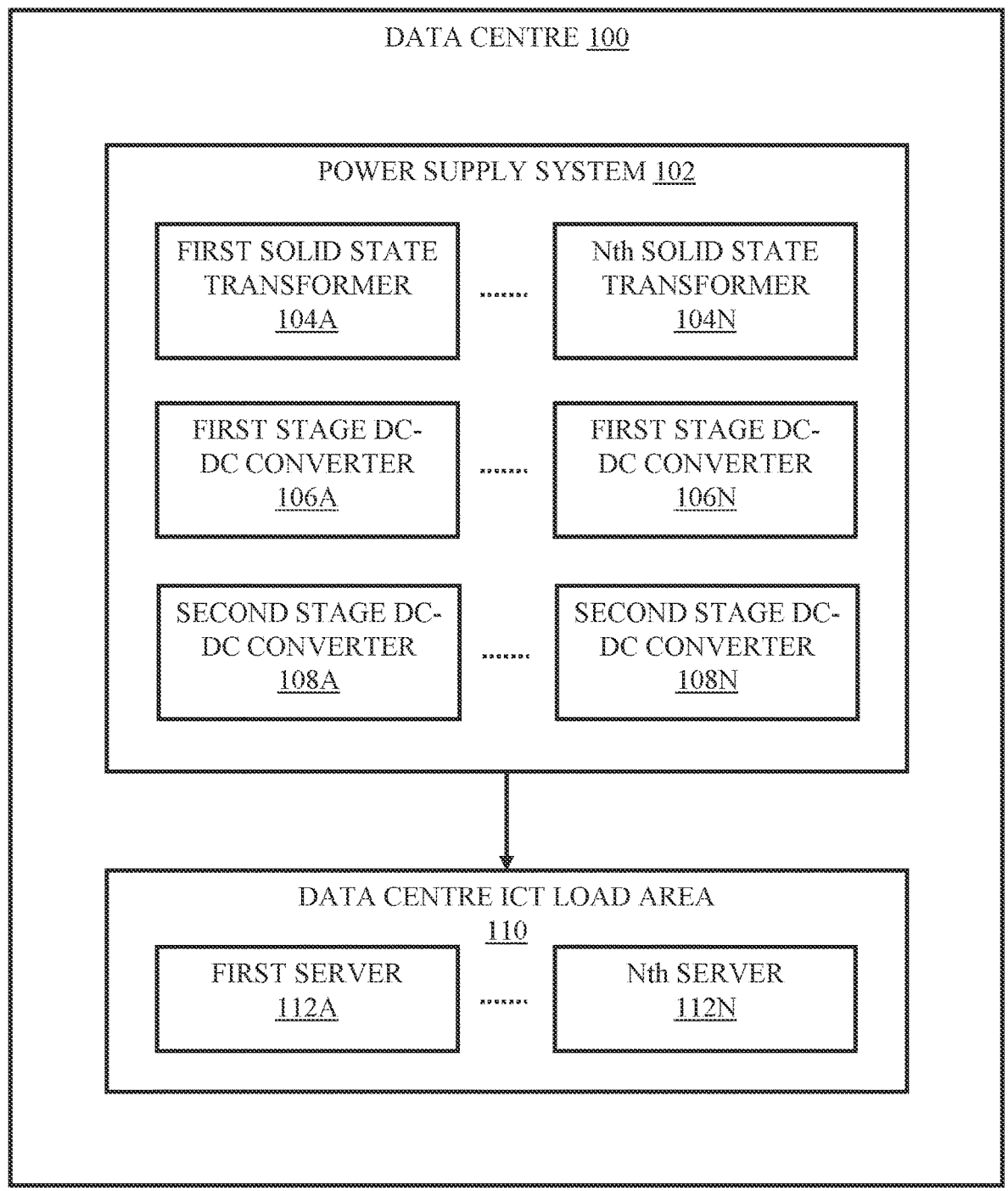
FIG. 1 illustrates a block diagram of a power supply system for a data centre in accordance with an exemplary implementation of the disclosure.

FIG. 1 is a block diagram of a power supply system 102 for a data centre 100 in accordance with an implementation of the disclosure. The power supply system 102 includes one or more Solid State Transformers (SST), 104A-N, one or more first stage DC-DC converters 106A-N and one or more second stage DC-DC converters 108A-N. The one or more Solid State Transformers (SST), 104A-N configured to convert any of Medium-Voltage Alternating Current (MVAC), input or Medium-Voltage Direct Current (MVDC), input to a first Low-Voltage Direct Current (LVDC), output. The one or more first stage DC-DC converters 106A-N configured to convert the first Low-Voltage DC output to a second LVDC output. The one or more second stage DC-DC converters 108A-N configured to convert the second LVDC output to a third LVDC output. The third LVDC output is used to supply power to one or more servers 112A-N in a data centre ICT load area 110.

The power supply system 102 provides a higher effective distribution voltage of +/−750 V DC reducing cost in cabling and distribution. The power supply system 102 is a more efficient power conversion system with less power conversion stages. The power conversion stages may step down by unregulated converters into +/−375 V DC. The power supply system 102 is a novel redundancy feed system that uses +750 V DC and −750 V DC as a backup to each other. The power supply system 102 provides better fault isolation and selectivity in distribution and mitigates a fault progression in the power supply system 102 (i.e. power partition by converter arrays with N+1 redundancy). The power supply system 102 provides constant power to the one or more servers 112A-N, avoiding 100 Hz ripple in the power supply. The power supply system 102 provides less short circuit energy to handle by use of power partitioning by smaller power conversion blocks by using output current limiting solid-state transformers. The power supply system 102 includes a Single Point of Failure (SPOF), analysis to provide maximum resilience in a power architecture or a power infrastructure. The power supply system 102 provides higher DC voltage to reduce distribution loss.

The power supply system 102 for the data centre 100 includes power partitioning that provides input parallel and output separate to transport the power efficiently. The power supply system 102 provides fault isolation and ground fault monitoring of Isolated Terra (IT) floating system. The power supply system 102 provides low ground fault currents due to an isolated grid. The power supply system 102 provides high power density with a bipolar DC transmission system, for example, +/−750V with a floating midpoint, potential shift technology that supports ground fault detection. The power supply system 102 for the data centre 100 provides high flexibility in selecting battery autonomy in one or more places with one or more rack rows and white space areas. The power supply system 102 may monitor the power infrastructure using a Power Line Communication, PLC.

The power supply system 102 is configured to step down the electricity from any of High Voltage Alternating Current (HVAC), Medium Voltage Alternating Current (MVAC), High Voltage Direct Current (HVDC) or Medium Voltage Direct Current (MVDC) to any of Low Voltage Direct Current (LVDC), or Secure Extra Low Voltage (SELV). The SELV may be any of the AC or a Direct Current, DC. The power supply system 102 may step down supply power from an electrical grid by converting a high-voltage power to a lower voltage power directly with one or more power conversion blocks. Preferably, the one or more power conversion blocks include the one or more solid state transformers 104A-N, one or more first stage DC-DC converters 106A-N, and one or more second stage DC-DC converters 108A-N. Preferably, the power supply system 102 is for partitioning the power using one or more, or smaller entities (i.e. the one or more power conversion blocks) for any of MVAC or MVDC, to LVDC conversion. Preferably, the power supply system 102 includes a DC architecture with DC power conversion and distribution. The power supply system 102 provides higher density and a single stage power module from LVDC to SELV (12V or 48V DC).

The one or more solid state transformers 104A-N may include one or more AC-AC converter and AC-DC converter that provide electrical isolation. The one or more solid state transformers 104A-N are configured to regulate voltage and current of the power from the electrical grid. The one or more solid state transformers 104A-N regulates voltage and current for down conversion of the power. Preferably, the one or more solid state transformers 104A-N include current limitation capability on the LVDC. The one or more first stage DC-DC converters 106A-N, and the one or more second stage DC-DC converters 108A-N are configured to regulate voltage and current of the power received from the one or more solid state transformers 104A-N. The one or more first stage DC-DC converters 106A-N and the one or more second stage DC-DC converters 108A-N regulate voltage and current for down conversion of the power. The power that is regulated in the one or more first stage DC-DC converters 106A-N, and the one or more second stage DC-DC converters 108A-N are used to supply power to the data centre ICT (Information and Communication Technology) load area 110. The data centre ICT load area 110 is configured to store and share one or more applications and data. The data centre ICT load area 110 may include one or more switches, one or more storage systems, one or more routers, one or more firewalls, and application delivery controls. Preferably, the data centre ICT load area 110 is a building, a dedicated space within the building, or a group of buildings, that houses one or more systems and associated components including telecommunications and the one or more storage systems.

Preferably, the MVAC input or the MVDC input is supplied from at least two input feeds.

Preferably, the first LVDC output and the second LVDC output are provided as a single voltage or two equal voltages of opposite polarities.

Preferably, the value of the first LVDC output is one of +750 V DC, +/−750 V DC, or +1500 V DC.

Preferably, the value of the second LVDC output is +/−375 V DC.

Preferably, the third LVDC output is secure extra low voltage, SELV.

Preferably, the power supply system 102 includes one or more redundancy devices to provide power backup at every stage in the power supply system 102.

Preferably, the one or more redundancy devices is a partial power converter.

Preferably, the partial power converter includes a resonant balancer circuit to split an input voltage into two equal halves.

Preferably, the one or more redundancy devices is a transformer coupled balancer with voltage split functionality.

Preferably, the one or more redundant balancers includes a plurality of diodes configured to block power flow back into a failure location in the power supply system 102.

Preferably, the power supply system 102 includes one or more transfer switches disposed between the one or more first stage DC-DC converters 106A-N and the one or more second stage DC-DC converters 108A-N to create a secondary feed redundancy.

Preferably, the power supply system 102 includes a permanent isolation monitoring means at an output of each of the one or more SSTs 104A-N.

Preferably, the power supply system 102 includes a selective fault protection means at least an input of each of the one or more SSTs 104A-N.

Preferably, the power supply system 102 includes a power line communication means in at least each of the one or more SSTs 104A-N, the one or more first stage DC-DC converters 106A-N, and the one or more second stage DC-DC converters 108A-N.

Preferably, the power supply system 102 for the data centre 100 identifies any of the earth leakage or fault, a short circuit, or an open circuit. The power supply system 102 may locate and clear fault when it identifies the earth leakage or fault. The power supply system 102 may operate in a redundant or backup mode while clearing the fault.

Figure 2:
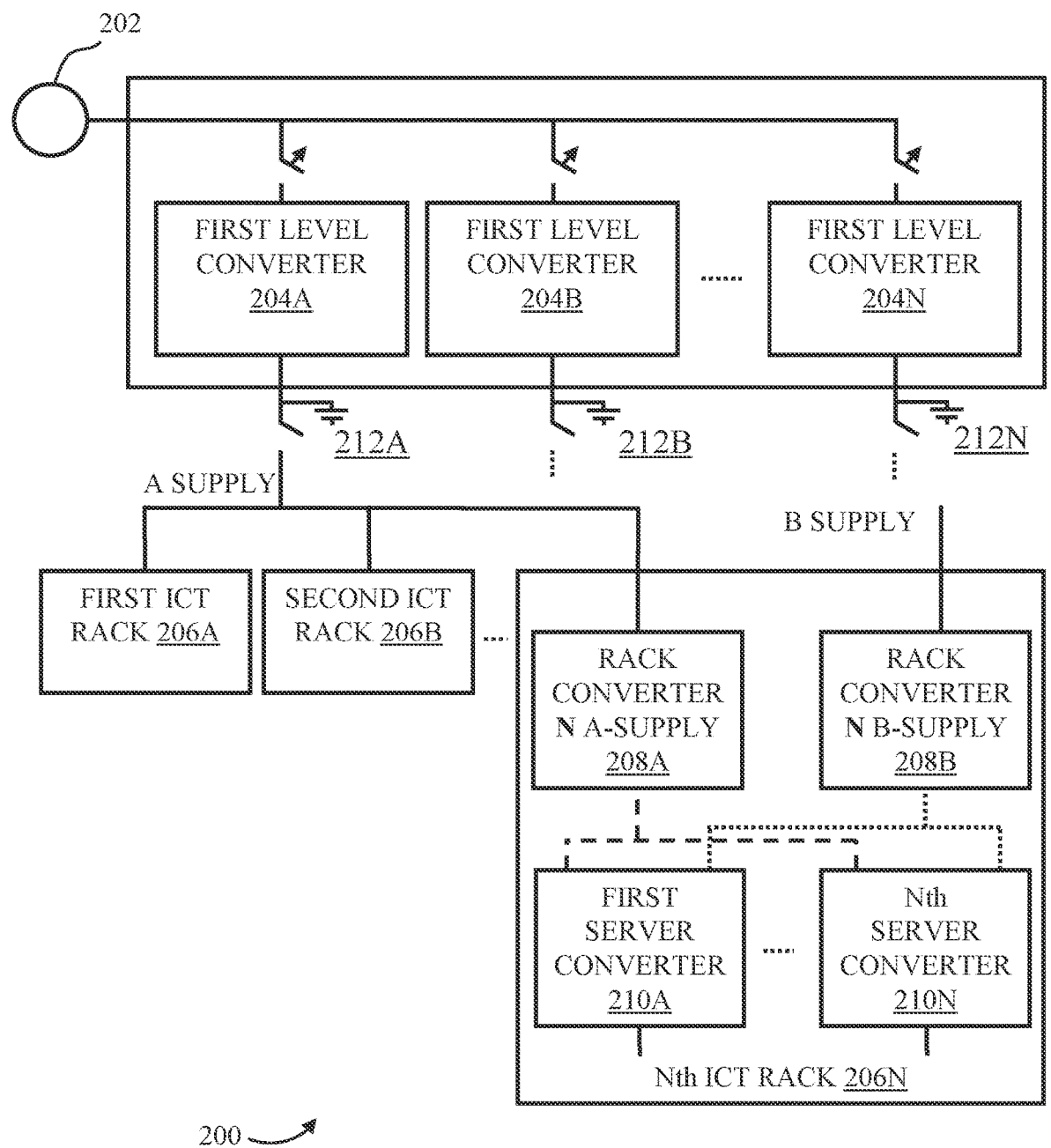
FIG. 2 illustrates a generic structure of a power supply system for a data centre in accordance with an exemplary implementation of the disclosure.

FIG. 2 illustrates a generic structure 200 of a power supply system for a data centre in accordance with an implementation of the disclosure. The generic structure 200 includes a grid connection 202, one or more first level converters 204A-N, and one or more ICT racks 206A-N. Preferably, the generic structure 200 includes one or more small power conversion blocks using power electronic conversion equipment to lower down any of Medium Voltage Alternating Current, MVAC or Medium Voltage Direct Current, MVDC across Lower Voltage Direct Current, LVDC to Secure Extra Low Voltage, SELV. The grid connection 202 is an electrical connection to a distribution grid for delivering electricity (i.e. power). Preferably, the grid connection 202 is a Medium Voltage Alternating Current, MVAC, grid. Preferably, the grid connection 202 is a Medium Voltage Direct Current, MVDC, grid. From the grid connection 202 any of the MVAC or the MVDC gets transferred to the one or more first level converters 204A-N. Preferably, the generic structure 200 includes a selective fault protection between the grid connection 202 and the one or more first level converters 204A-N to protect the power supply system from any of high-voltage, or low-voltage distributions and fluctuations in the power. The one or more first level converters 204A-N receives the power from the grid connection 202. The one or more first level converters 204A-N may be a modular solid-state transformer. The modular solid-state transformer may be small in size. Preferably, the one or more first level converters 204A-N regulate voltage and current in the power received from the grid connection 202. Preferably, the conversion in the one or more first level converters 204A-N is a first level power conversion in the power supply system. The one or more first level converters 204A-N may be for isolation of MV-LV.

The power that is regulated in the one or more first level converters 204A-N are transmitted to the one or more ICT racks 206A-N. The one or more ICT racks 206A-N includes an A-supply, a B-supply, a first rack converter, a second rack converter, one or more server converters powered from any of the first rack converter or the second rack converter. The Nth ICT Rack 206N includes a rack converter N A-supply 208A, a rack converter N B-supply 208B, and one or more server converters 210A-N powered from any of the rack converter N A-supply 208A or the rack converter N B-supply 208B. The rack converter N A-supply 208A may be powered from one or more first level converters 204A-N and the rack converter N B-supply 208B may be powered from another first level converters. Preferably, the conversion in the rack converter N A-supply 208A and the rack converter N B-supply 208B is a second level power conversion in the power supply system that is placed in or on top of the one or more ICT racks 206A-N. The power that is regulated in the rack converter N A-supply 208A and the rack converter N B-supply 208B are transmitted to the one or more server converters 210A-N. The one or more server converters 210A-N are configured to regulate the power received from the rack converter N A-supply 208A and the rack converter N B-supply 208B. The one or more server converters 210A-N may be for isolation from LV to SELV. Preferably, the conversion in the one or more server converters 210A-N is a third level power conversion in the power supply system.

Preferably, the generic structure 200 includes a selective fault protection between any of the one or more first level converters 204A-N and the one or more ICT racks 206A-N, or the one or more ICT racks 206A-N and the one or more server converters 210A-N, to protect the power supply system from any of high-voltage, or low-voltage distributions and fluctuations in the power. The selective fault protection may include any of hybrid solid-state breakers, or pure solid-state breakers.

Preferably, the one or more first level converters 204A-N includes a permanent isolation (iso) monitoring at every solid-state transformer output. Preferably, the one or more first level converters 204A-N, the rack converter N A-supply 208A, the rack converter N B-supply 208B, and the one or more server converters 210A-N lowers down the MVAC or the MVDC across LVDC, to SELV. The generic structure 200 may include one or more possible levels to lower down the MVAC or the MVDC to SELV. The one or more possible levels may be the first level power conversion, the second level power conversion, and the third level power conversion in the power supply system.

The generic structure 200 also contains one or more energy storage blocks 212A-N, to back-up the power during the events of partial power outage. Preferably, the one or more energy storage blocks 212A-N are battery systems of different chemistries. Preferably, the battery systems are of Lithium battery chemistry.

Figure 3:
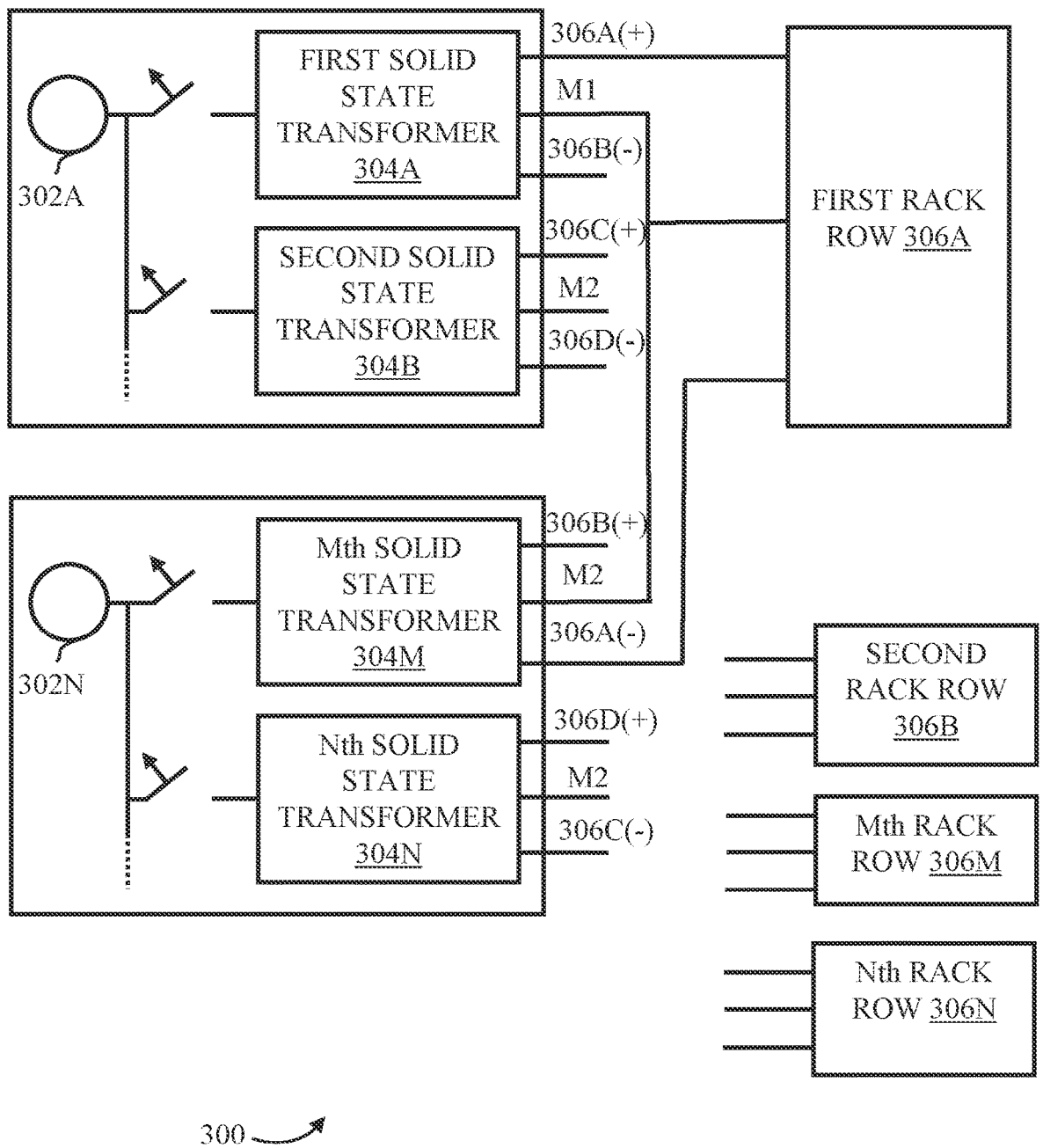
FIG. 3 illustrates a block diagram of an architecture and redundancy structure of a power supply system in accordance with an exemplary implementation of the disclosure.

FIG. 3 illustrates a block diagram 300 of an architecture and redundancy structure of a power supply system in accordance with an implementation of the disclosure. The block diagram 300 includes one or more electrical grids 302A-N, one or more solid state transformers 304A-N, and one or more rack rows 306A-N. The one or more electrical grids 302A-B is an electrical grid that delivers power. The one or more solid state transformers 304A-N is configured to regulate voltage and current in the power received from the one or more electrical grids 302A-N. Preferably, the one or more solid state transformers 304A-N with several 100 kW, from at least two Medium Voltage Alternating Current, MVAC input feeds produce an output voltage of 750 V DC or +750 V DC and −750 V DC. The +/−750 V DC output may be used as a single +1500 V DC output.

The power that is regulated in the one or more solid state transformers 304A-N is transmitted to the one or more rack rows 306A-N. The one or more rack rows 306A-N includes one or more redundancy structures for regulating and supplying the power to servers. Preferably, the one or more rack rows 306A-N is a server rack. The one or more redundancy structures may be a redundant power supply structure with +750 V DC from any of the one or more solid state transformers 304A-N, and another −750 V DC from any of the one or more solid state transformers 304A-N. Preferably, the +/−750 V DC from any of the one or more solid state transformers 304A-N are independently fed by the one or more electrical grids 302A-N.

Figure 4A:
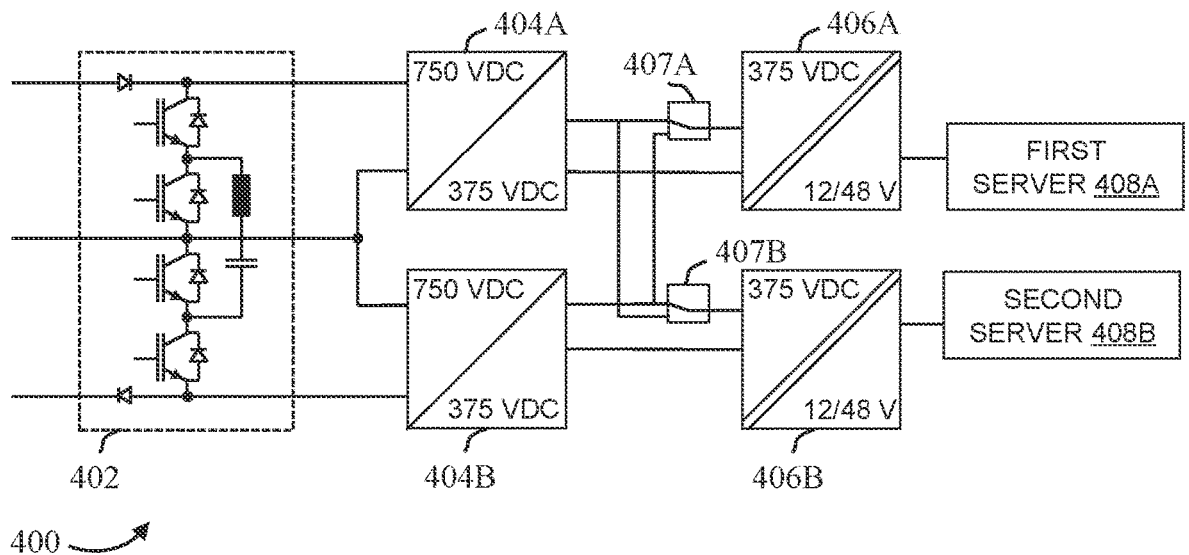
FIGS. 4A-4F illustrate schematic diagrams of exemplary redundancy structures of a power supply system for server racks in accordance with an exemplary implementation of the disclosure.

FIGS. 4A-4F illustrate schematic diagrams of exemplary redundancy structures of a power supply system for server racks in accordance with an implementation of the disclosure. The server racks receive power from one or more solid state transformers. FIG. 4A shows an exemplary redundancy structure 400 that includes a redundant balancer 402, one or more unregulated DC-DC converters 404A-B, one or more server Power Supply Unit, PSUs, 406A-B, and one or more servers 408A-B. The redundant balancer 402 is configured to create a power backup from one of +/− supply lines to other lines. The redundant balancer 402 includes one or more diodes to block a flow of the power. Preferably, the one or more diodes block the flow of the power into a failure location in other areas of the power supply system. The one or more unregulated DC-DC converters 404A-B are configured to down conversion of the power from the one or more solid state transformers. The one or more unregulated DC-DC converters 404A-B may include unregulated down conversion from 750 V DC level to 375 V DC level. Preferably, slightly modified AC server power supplies are used to power Information and Communication Technology (ICT) hardware. The one or more unregulated DC-DC converters 404A-B include a conversion of 2:1 DC-DC to reduce the voltage level from 750 V DC to 375 V DC. The reduction of the voltage level may be for usual creepage and clearance distances in the one or more server PSUs 406A-B. The one or more server PSUs 406A-B are configured to supply power to the one or more servers 408A-B. Preferably, the exemplary redundancy structure 400 includes one or more transfer switches 407A-B that create a second means of feed redundancy on the level of +/−375 V DC. The one or more transfer switches 407A-B may be placed between the one or more unregulated DC-DC converters 404A-B and the one or more server PSUs 406A-B. Preferably, the one or more transfer switches 407A-B are ultra-fast transfer switches.

Figure 4B:
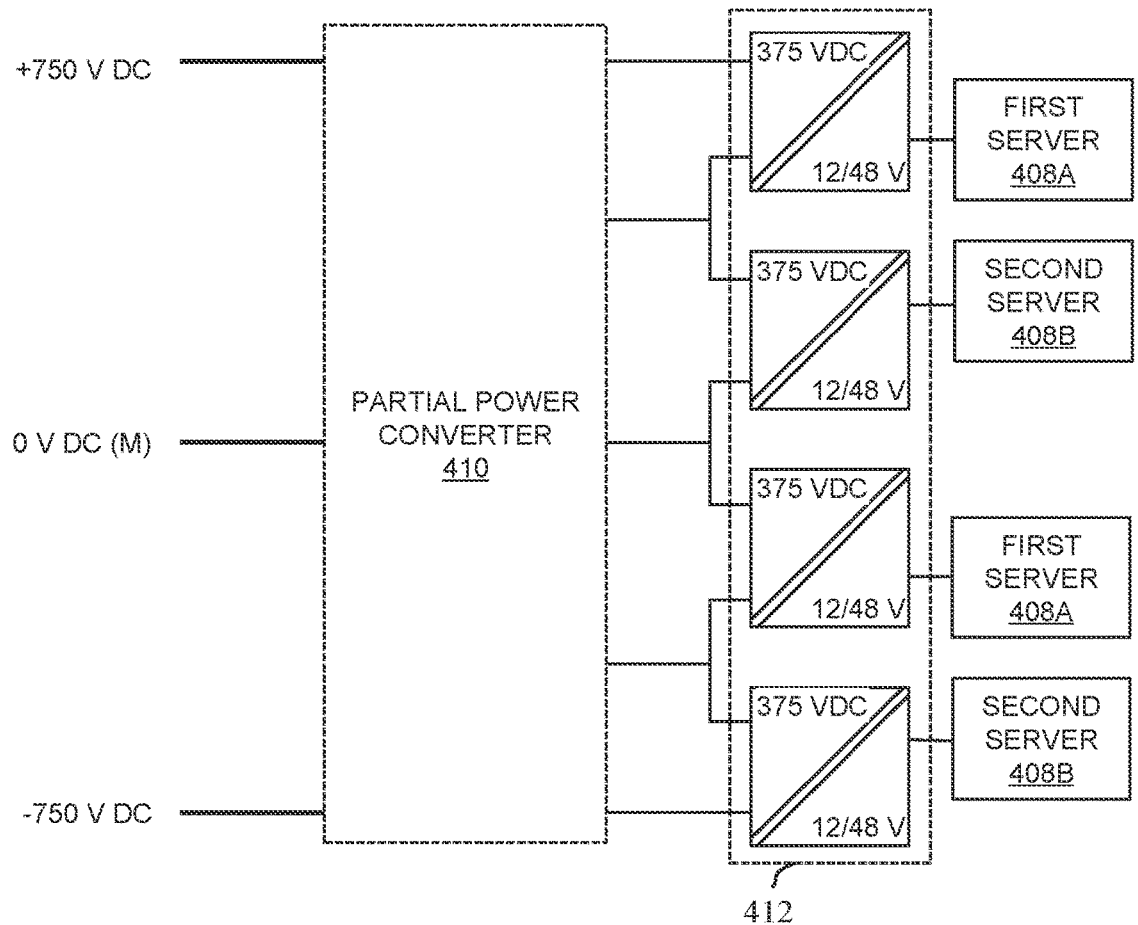

FIG. 4B illustrates an exemplary redundancy structure 414 that includes a partial power converter 410, a chain of cascaded server PSUs 412, and one or more servers 408A-B. The partial power converter 410 is configured to balance the voltage amongst the chain of cascaded server PSUs 412. Preferably, the partial power converter 410 includes power conversion from 1500 V DC out of +/−750 V DC feed A/B into serial connected redundant server power supplies. The chain of cascaded server PSUs 412 includes one or more converters for receiving and regulating the balanced power from the partial power converter 410. The regulated power is supplied to the one or more servers 408A-B. Preferably, the exemplary redundancy structure 414 processes only differential power that provides high efficiency even when using less efficient circuits.

Figure 4C:
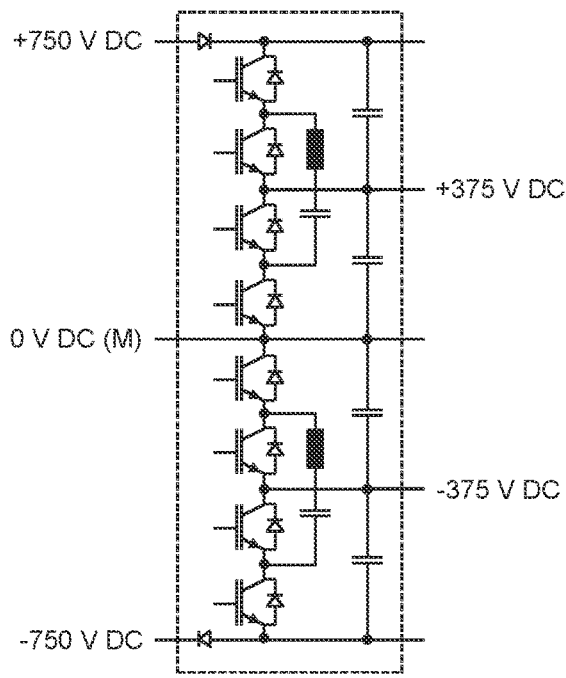

FIG. 4C illustrates an exemplary redundancy structure 416 for voltage split in the power supply system. The exemplary redundancy structure 416 includes a resonant balancer circuit including a flying capacitor and an inductor, and a series resonant circuit. The series resonant circuit may be used to split the source voltage into two equal halves. The series resonant circuit operates at resonant frequency eliminates switching losses and the series resonant circuit provides high efficiency. Preferably, the exemplary redundancy structure 416 is a voltage divider that divides the source voltage into two equal halves. Preferably, the resonant balancer circuit includes one or more insulated-gate bipolar transistors, IGBT, or metal-oxide field effect transistors, MOSFET.

Figure 4D:
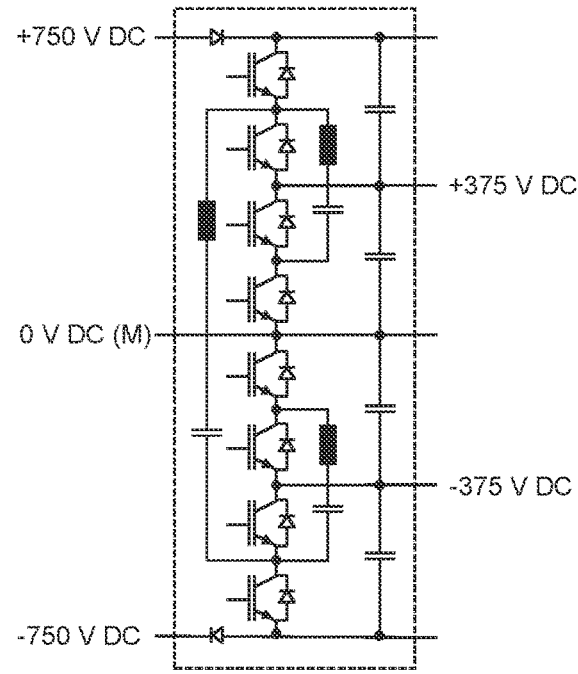

FIG. 4D illustrates an exemplary redundancy structure 418 for the voltage split in the power supply system. The exemplary redundancy structure 418 includes a redundant resonant balancer circuit and a voltage split for power conversions and distributions. Preferably, a feed redundancy and a split power conversion are obtained with the exemplary redundancy structure 418.

Figure 4E:
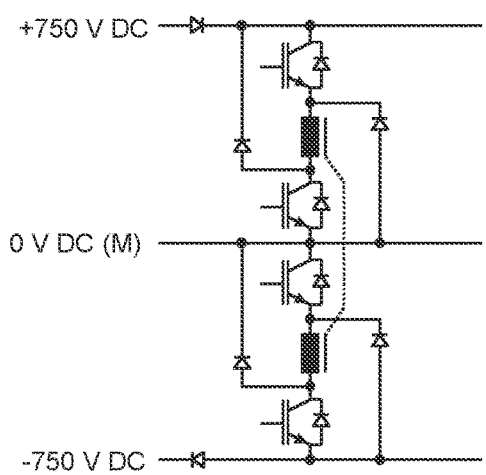

FIG. 4E illustrates an exemplary redundancy structure 420 of a transformer coupled balancer circuit. The exemplary redundancy structure 420 includes a two switch forward topology for feed redundancy in the power.

Figure 4F:
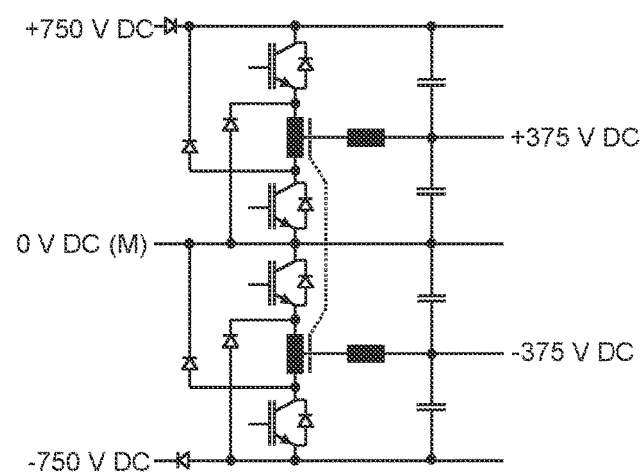

FIG. 4F illustrates an exemplary redundancy structure 422 of a transformer coupled balancer circuit for a voltage split function. The exemplary redundancy structure 422 may be a transformer-based solution for feed redundancy and voltage split of the power.

It should be understood that the arrangement of components illustrated in the figures described are exemplary and that other arrangement may be possible. It should also be understood that the various system components (and means) defined by the claims, described below, and illustrated in the various block diagrams represent components in some systems configured according to the subject matter disclosed herein. For example, one or more of these system components (and means) may be realized, in whole or in part, by at least some of the components illustrated in the arrangements illustrated in the described figures.

In addition, while at least one of these components are implemented at least partially as an electronic hardware component, and therefore constitutes a machine, the other components may be implemented in software that when included in an execution environment constitutes a machine, hardware, or a combination of software and hardware.

What is claimed is:

1. A power supply system for a data centre, the power supply system comprising:
   one or more solid state transformers (SST) configured to convert any of a medium-voltage alternating current (MVAC) input or a medium-voltage direct current (MVDC) input to a first low-voltage direct current (LVDC) output;
   one or more first stage DC-DC converters configured to convert the first LVDC output to a second LVDC output, wherein the first LVDC output and the second LVDC output are configured to be provided as a single voltage or two equal voltages of opposite polarities, wherein a value of the first LVDC output is one of +750 V DC, +/−750 V DC, or +1500 V DC, and wherein a value of the second LVDC output is +/−375 V DC;
   one or more second stage DC-DC converters configured to convert the second LVDC output to a third LVDC output, wherein the third LVDC output is configured to supply power to one or more servers in a data centre information and communication technology (ICT) load area, and wherein the third LVDC output is secure extra low voltage (SELV); and
   one or more redundancy devices configured to provide power backup at every stage in the power supply system, wherein the one or more redundancy devices is a partial power converter, and wherein the partial power converter comprises a resonant balancer circuit configured to split an input voltage into two equal halves.

2. The power supply system of claim 1, wherein the MVAC input or the MVDC input is configured to be supplied from at least two input feeds.

3. The power supply system of claim 1, wherein the one or more redundancy devices is a transformer coupled balancer with voltage split functionality.

4. The power supply system of claim 3, wherein the transformer coupled balancer comprises a plurality of diodes configured to block power flow back into a failure location in the power supply system.

5. The power supply system of claim 4, further comprising one or more transfer switches disposed between the one or more first stage DC-DC converters and the one or more second stage DC-DC converters to create a secondary feed redundancy.

6. The power supply system of claim 5, further comprising a permanent isolation monitor at an output of each of the one or more SSTs.

7. The power supply system of claim 6, further comprising a selective fault protection unit at an input of each of the one or more SSTs.

8. The power supply system of claim 7, further comprising a power line communication unit at each of the one or more SSTs, the one or more first stage DC-DC converters, and the one or more second stage DC-DC converters.

* * * * *